(12) United States Patent
Demerath

(10) Patent No.: US 11,161,393 B2
(45) Date of Patent: Nov. 2, 2021

(54) AIR VENT FOR A VEHICLE

(71) Applicant: Illinois Tool Works Inc., Glenview, IL (US)

(72) Inventor: Michael Demerath, Hüffler (DE)

(73) Assignee: Illinois Tool Works Inc., Glenview, IL (US)

( * ) Notice: Subject to any disclaimer, the term of this patent is extended or adjusted under 35 U.S.C. 154(b) by 300 days.

(21) Appl. No.: 16/003,397

(22) Filed: Jun. 8, 2018

(65) Prior Publication Data

US 2018/0354346 A1     Dec. 13, 2018

(30) Foreign Application Priority Data

Jun. 8, 2017   (DE) .......................... 102017112616.3

(51) Int. Cl.
*B60H 1/34*   (2006.01)
*F24F 13/14*  (2006.01)

(52) U.S. Cl.
CPC ... *B60H 1/3421* (2013.01); *B60H 2001/3471* (2013.01); *F24F 13/1413* (2013.01)

(58) Field of Classification Search
CPC ......... B60H 1/3421; B60H 2001/3471; B60H 1/34; B60H 1/3414; B60H 1/345; F24F 13/1413; F24F 13/082
USPC ...................................................... 454/155
See application file for complete search history.

(56) References Cited

U.S. PATENT DOCUMENTS

| | | | |
|---|---|---|---|
| 2008/0081550 A1 | 4/2008 | Shibata et al. | |
| 2008/0146139 A1 | 6/2008 | Terai et al. | |
| 2014/0302769 A1* | 10/2014 | Sawada | F24F 13/082 454/315 |
| 2015/0065031 A1* | 3/2015 | Shibata | B60H 1/3421 454/322 |
| 2016/0009163 A1 | 1/2016 | Terai et al. | |
| 2018/0215238 A1* | 8/2018 | Lee | B60H 1/3421 |

FOREIGN PATENT DOCUMENTS

| | | |
|---|---|---|
| DE | 10063189 A1 | 6/2002 |
| DE | 202014104226 U1 | 11/2014 |
| DE | 102014101315 A1 | 4/2015 |
| DE | 202015102026 U1 | 6/2015 |
| JP | 2010105507 A | 5/2010 |

* cited by examiner

*Primary Examiner* — Steven B McAllister
*Assistant Examiner* — Charles R Brawner
(74) *Attorney, Agent, or Firm* — Quarles & Brady LLP

(57) ABSTRACT

Air vent includes a housing and an air duct having an air inlet end and an air outlet end, wherein an air flow flowing through the air duct can flow along a main flow direction from the air inlet end to the air outlet end. The air vent includes a front air-guiding element in the air duct that is adjustable about a front axis of rotation. The air vent includes a rear air-guiding element which is arranged in the air duct upstream of the front air-guiding element and is adjustable about a rear axis of rotation. The front air-guiding element can be rotated about the front axis of rotation and the rear air-guiding element can be rotated about the rear axis of rotation by moving a control element.

19 Claims, 3 Drawing Sheets

AIR VENT FOR A VEHICLE

RELATED APPLICATIONS

The present application claims priority to German Patent Application No. 10 2017 112 616.3, entitled "Air Vent for a Vehicle," which was filed on Jun. 8, 2017 and which is incorporated herein by reference in its entirety.

FIELD OF EMBODIMENTS OF THE DISCLOSURE

Embodiments relate to an air vent for a vehicle, comprising a frame-shaped housing with a rear-side air inlet opening and a front-side air outlet opening, between which a flow portion for air flowing along a flow direction from the air inlet opening to the air outlet opening is formed.

BACKGROUND

The vehicle interior compartment is ventilated using air vents. Air is supplied via a rear-side air inlet opening and flows through the air vent to a front-side air outlet opening, from which the air emerges into the vehicle interior compartment. In the housing, there are arranged air-guiding elements, for example pivotable air-guiding slats. The air-guiding elements can be actuated, for example pivoted, by means of a normally manually actuated operating element. In this way, the air stream can be diverted in the desired manner.

DE 20 2015 102 026 U1 has disclosed an air vent in the case of which the housing has two mutually oppositely situated arcuate regions which become larger proceeding from an air inlet section and proceeding from an air outlet section towards a central section. In the region of the central section, there is arranged a slat which is pivotable by means of a control device about an axis of rotation running centrally in the central section, wherein the slat is, for the air deflection stream, pivotable oppositely to an adjustment movement of the control device. In a rest position, in which no air deflection stream is performed, the first slat and the control device are situated at the same height one behind the other. In the case of this air vent, a slat in the region of the air outlet opening is omitted. Rather, the air deflection is realized by means of the arcuate section of the housing. A disadvantage of this air vent is in particular the cross section of the housing, which is greatly enlarged in relation to the air outlet opening. Accordingly, in the case of this air vent, it is necessary for an air deflection to be realized by means of the arcuate regions of the housing. Also, DE 20 2014 104 226 U1 has disclosed an air vent in the case of which a housing region that is of widened cross section in relation to the air outlet opening must be utilized for the air deflection.

Specifically in the case of the narrow outlet openings that are often desired, a relatively large housing results in the case of the known air vents. As a result, the installation of the air vent from the vehicle interior compartment into an installation opening of the instrument panel is possible only if the installation opening is at least as large as the housing. Since the outlet opening of the air vent is however smaller than the housing, it is necessary for the opening that remains open after the installation process to be covered using a correspondingly wide trim panel, which is often undesired not least for visual reasons. Alternatively, it would also be possible for the air vent to be installed in the instrument panel from the rear side facing away from the vehicle interior compartment. It is then duly possible for the installation opening, facing towards the vehicle interior compartment, of the instrument panel to be smaller. However, uninstallation of the air vent, for example for repair or maintenance purposes, is then cumbersome because it is firstly necessary for the instrument panel to be uninstalled. A large structural space for air vents is basically undesired, because this structural space is then no longer available for surrounding components.

DE 100 63 189 A1 has disclosed an air vent in the case of which the cross section of the housing is not larger than the air outlet opening. Here, on the upper and lower housing walls, there is arranged in each case one air-guiding element which, by means of a rotatably mounted manual operating lever and substantially vertically displaceable connecting and tilting levers connected to said operating lever, can be adjusted such that an air deflection upwards or downwards is realized. Here, it is sought to utilize the so-called Coanda effect. The desired air deflection is however not always possible by means of the air-guiding elements which, in the case of this air vent, are arranged only on oppositely situated housing walls. Furthermore, the outlet opening is substantially completely open. There is therefore the risk of objects inadvertently falling into the housing from the outside, or of the housing of the air vent being misused as a storage means. Furthermore, large openings in the instrument panel are also generally undesired for visual reasons. As a result, in turn, the size of the air outlet opening and thus the air throughput in the case of this air vent are considerably limited.

Further air vents are known from DE 2014 101 315 A1 or US 2016/0009163 A1. These air vents, too, do not always permit the desired air deflection in a reliable manner.

SUMMARY OF EMBODIMENTS OF THE DISCLOSURE

At least some of the embodiments described herein may be an air vent of the type described above that reliably permits an effective air deflection for the outflowing air. Optionally, the air vents have a small structural height.

In an embodiment, an air vent for a vehicle is provided. The air vent includes a frame-shaped housing with a rear-side air inlet opening and a front-side air outlet opening, between which a flow portion for air flowing along a flow direction from the air inlet opening to the air outlet opening is formed. A plurality of air-guiding elements are arranged in the housing, and an actuating element is provided for actuating the air-guiding elements. The air-guiding elements comprise at least one front air-guiding slat arranged near the air outlet opening and at least one rear air-guiding slat. The at least one rear air-guiding slat is offset in relation to the at least one front air-guiding slat in a direction perpendicular to the flow direction of the air. The at least one front air-guiding slat and the at least one rear air-guiding slat are pivotably coupled to each other and movable between two end positions. The air can flow around the at least one front air-guiding slat on both sides in each of the end positions. In at least one end position, a first flow cross section is formed between a rear end of the at least one front air-guiding slat and a housing wall. The rear end faces the at least one rear air-guiding slat. A second flow cross section is formed between the rear end of the at least one front air-guiding slat and a front end of the at least one rear air-guiding slat. The front end faces the at least one front air-guiding slat.

In an embodiment, an air vent for a vehicle is provided. The air vent includes a frame-shaped housing with a rear-side air inlet opening and a front-side air outlet opening, between which a flow portion for air flowing along a flow direction from the air inlet opening to the air outlet opening is formed. The air vent also includes a plurality of air-guiding elements arranged in the housing. The air vent also includes an actuating element for actuating the air-guiding elements. The air-guiding elements include a front air-guiding slat, an upper rear air-guiding slat, and a lower rear air-guiding slat, wherein the upper and lower rear air-guiding slats are offset relative to the front air-guiding slat. The front air-guiding slat is pivotably coupled to the upper rear air-guiding slat and to the lower rear air-guiding slat such that the front air-guiding slat and the upper and lower rear air-guiding slats are movable as a group between different end positions. In one of the end positions, a first flow cross section is formed between a rear end of the front air-guiding slat and a housing wall and a second flow cross section is formed between the rear end of the front air-guiding slat and a front end of one of the upper or lower rear air-guiding slats.

BRIEF DESCRIPTION OF THE DRAWINGS

An exemplary embodiment will be discussed in more detail below on the basis of figures, in which, in each case schematically.

Figure 1:
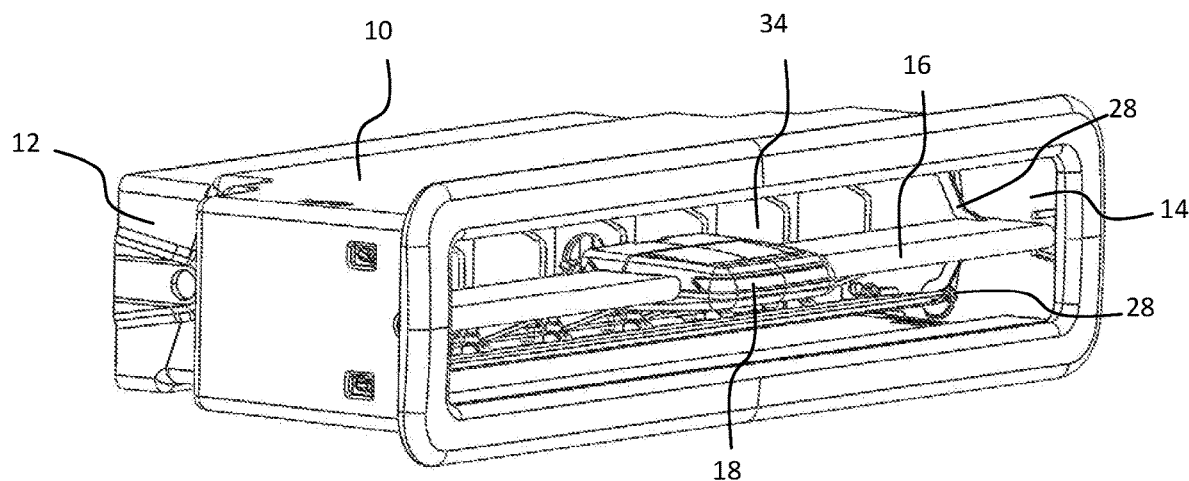
FIG. 1 shows an air vent according to one embodiment in a perspective view from the front.
Figure 2:
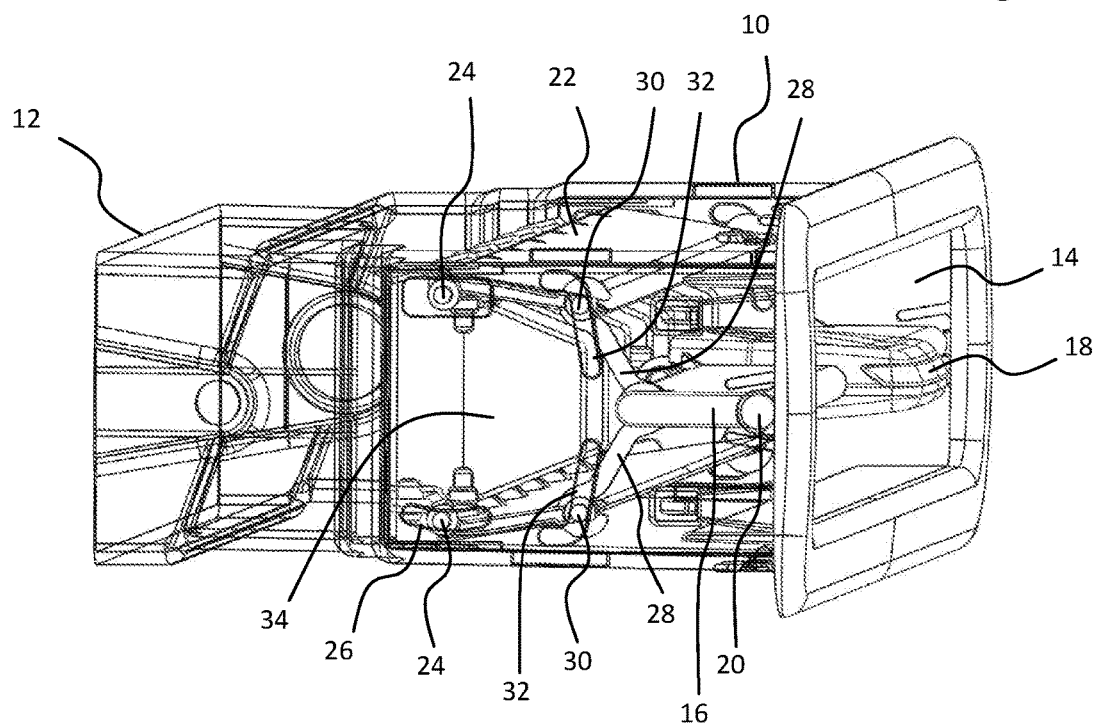
FIG. 2 shows the air vent from FIG. 1 in a partially transparent perspective side view.

Unless stated otherwise, the same reference designations are used to denote identical items in the figures.

DETAILED DESCRIPTION OF EMBODIMENTS OF THE DISCLOSURE

In some embodiments, the air-guiding elements comprise at least one front air-guiding slat arranged in the region of the air outlet opening and at least one rear air-guiding slat, wherein the at least one rear air-guiding slat is offset in relation to the at least one front air-guiding slat in a direction perpendicular to the flow direction of the air, and wherein the at least one front air-guiding slat and the at least one rear air-guiding slat are coupled to each other in such a manner that they are pivotable between two end positions, and that air can flow around the at least one front air-guiding slat in the end positions on both sides in each case, wherein, in at least one end position, a first flow cross section is formed between a rear end of the at least one front air-guiding slat, said rear end facing the at least one rear air-guiding slat, and a housing wall, and a second flow cross section is formed between the rear end of the at least one front air-guiding slat and a front end of the at least one rear air-guiding slat, said front end facing the at least one front air-guiding slat. Here, it is possible in particular that, in both end positions, in each case a first flow cross section is formed between a rear end of the at least one front air-guiding slat, said rear end facing the at least one rear air-guiding slat, and a housing wall, and a second flow cross section is formed between the rear end of the at least one front air-guiding slat and a front end of the at least one rear air-guiding slat, said front end facing the at least one front air-guiding slat.

The air vent is provided for a vehicle, in particular a passenger motor vehicle or a heavy goods vehicle. It is installed into the vehicle for the purposes of ventilating the vehicle interior compartment. In particular, the air vent is inserted with its housing into an installation opening of the instrument panel. Fresh air is supplied to the air inlet opening and flows in a flow direction through the flow portion of the air vent to the air outlet opening, through which it emerges into the vehicle interior compartment to be ventilated. The flow direction refers to the flow direction of the air in the case of air-guiding elements situated in a rest position, that is to say in the case of a non-deflected air flow. Said flow direction generally equates to the longitudinal direction of the flow portion formed in the housing.

Air-guiding elements are provided for guiding the air flow. In some embodiments, at least one front air-guiding slat and at least one rear air-guiding slat are provided. The air-guiding slats may each for example be of aerofoil-shaped form. The at least one front air-guiding slat may be arranged in the air outlet opening, for example centrally. The at least one rear air-guiding slat is, in particular in the rest position, arranged offset, in a direction perpendicular to the flow direction, with respect to the at least one front air-guiding slat. The front and rear air-guiding slats are thus in particular arranged offset with respect to each other in height. In particular, the front and rear ends of the at least one rear air-guiding slat may, in all positions of the air-guiding slats, be offset with respect to the at least one front air-guiding slat perpendicularly to the flow direction. The air-guiding slats may in particular be arranged offset such that they do not overlap as viewed perpendicularly to the flow direction.

With the front and rear air-guiding slats, the air flow can, in relation to a generally horizontal outlet direction, be deflected for example upwards or downwards into the vehicle interior compartment. For this purpose, the at least one front and at least one rear air-guiding slat are pivotable about in particular parallel pivot axes between two end positions. An actuating element is provided for the pivoting of the air-guiding slats. The actuating element may be manually actuatable. For example, the actuating element may be a sliding button. The actuating element may for example be arranged on a front air-guiding slat. It is however for example also conceivable for the actuating element to be a, for example, electric-motor-operated actuator for the electric adjustment of the air-guiding slats. The air-guiding slats may be mounted with the opposite end faces pivotably in a housing wall. For this purpose, on the end faces of the air-guiding slats, there may be formed for example pivot pins which engage into corresponding pin receptacles of the housing walls.

The air outlet opening has a width several times larger than its height. A longitudinal direction of the air outlet opening is defined by the relatively large width. The longitudinal axes of the at least one front and at least one rear air-guiding slats, and thus the pivot axes thereof, run in particular in the longitudinal direction of the air outlet opening, for example horizontally in the state installed in a vehicle. A maximum air deflection is realized in the end positions. The front and rear air-guiding slats may assume a rest position for example centrally between the end positions. In this rest position, aside from the unavoidable influencing of the air flow by the air-guiding slat(s) situated in the flow portion, no deflection of the air flowing through the air vent occurs. The air is then discharged with the maximum flow cross section. In the rest position, the at least one front air-guiding slat and/or the at least one rear air-guiding slat may, for this purpose, be oriented in the flow direction.

The at least one rear air-guiding slat diverts the air flow in the direction of the at least one front air-guiding slat. The at least one front air-guiding slat deflects the air in the desired manner out of the air outlet opening. In some embodiments, the at least one front air-guiding slat does not in any pivoting position close against the upper or lower housing wall. Therefore, in the end positions, there is always a remaining non-zero flow cross section to both sides of the at least one front air-guiding slat, in particular above and below the at least one front air-guiding slat. The flow cross sections formed to both sides of the at least one front air-guiding slat may extend substantially along the entire length of the at least one front air-guiding slat. In a direction perpendicular to the longitudinal direction of the at least one front air-guiding slat, the flow cross sections formed to both sides of the at least one front air-guiding slat may have a size of in each case for example at least 3 mm, preferably at least 5 mm. The flow cross sections formed to both sides of the at least one front air-guiding slat refer here in particular to the minimum flow cross sections that delimit the respective air flow. The first and second flow cross sections form the flow cross sections formed to both sides of the at least one front-guiding slat. Depending on which end position the air-guiding slats are situated in, the first flow cross section is formed above or below the at least one front air-guiding slat. The housing wall that delimits the first flow cross section is thus in particular the upper or lower housing wall depending on the pivoting position of the at least one front air-guiding slat. The first flow cross section may, in the end position(s), form the smallest flow cross section for air flow above or below the at least one front air-guiding slat. Also, the second flow cross section may, in the end position(s), form the smallest flow cross section for an air flow below or above the at least one front air-guiding slat. In front of the first or second flow cross section as viewed in the flow direction, there is initially (in each case) a flow cross section which is at least as large as the first or second flow cross section, preferably larger than the first or second flow cross section. Behind the first or second flow cross section as viewed in the flow direction, there is then (in each case) a larger flow cross section than in the first or second flow cross section.

By means of the first and second flow cross sections, the air flow can be deflected optimally in the desired manner. In particular, it can thus be achieved that the air flow attaches to the at least one front air-guiding slat on both sides. In some embodiments, the housing walls do not need to participate in the air deflection, or do not need to participate in the air deflection in the manner required for known air vents. Accordingly, there is no need for curved housing walls that increase the cross section. In particular, by contrast to known air vents, the housing does not need to have a much larger cross section than the air outlet opening. At the same time, as a result of the interaction of the rear and front air-guiding slats, a deflection of the air flow is reliably possible even with large deflection angles. For example, a deflection angle of at least +/−25° in relation to the non-deflected air flow may be present in the end positions.

In some embodiments, a slim air vent is created which makes do with a minimum structural height and nevertheless permits a good deflection angle for the outflowing air. At the same time, a low flow resistance is realized in all pivoting positions of the air-guiding slats. Since, in all pivoting positions of the at least one front air-guiding slat, an air flow is present on both sides of the air-guiding slat, which air flow attaches to the respective slat surface, a particularly good air deflection and a low flow resistance in all pivoting positions are ensured. The air flows out in the direction predefined by the pivot angle of the at least one front air-guiding slat. Because the cross section of the housing does not need to be much larger than the cross section of the air outlet opening, a small structural height of the air vent is made possible. In this way, the air vent can be inserted into an installation opening of an instrument panel from the vehicle interior compartment, wherein the installation opening does not need to be much larger than the air outlet opening of the air vent. It is thus possible to dispense with the use of correspondingly large trim panels. At the same time, uninstallation from the vehicle interior compartment is easily possible without the need to uninstall the instrument panel.

Where the terms "top" and "bottom" or "above" and "below" are used in the context of this patent application, this is not associated with a restriction with regard to the arrangement or installation position of the air vent. Rather, "above" or "below" relate merely to a relative position along a direction running perpendicular to the flow direction of the air. The terms "above" and "below" or "top" and "bottom" nevertheless correspond to the normal installation position of the air vent.

It is possible for exactly one or multiple front air-guiding slats to be provided. If multiple front air-guiding slats are provided, these are in particular arranged parallel to each other and pivotable about parallel pivot axes. They may be coupled to each other, for example by means of one or more coupling rods, in order to synchronize their pivoting movement. It is also possible for exactly one or more rear air-guiding slats to be provided. If for example two rear air-guiding slats are provided, one may be arranged so as to be offset upwards, and one may be arranged so as to be offset downwards, in relation to the at least one front air-guiding slat.

Embodiments may also include a vehicle, for example a passenger motor vehicle or heavy goods vehicle, with an air vent installed therein. Embodiments may also include a method for installing the air vent, in which method the air vent is inserted with its housing into an installation opening of an instrument panel from the front side, facing towards the vehicle interior compartment, of the instrument panel.

The at least one rear air-guiding slat may be arranged upstream of the front air-guiding slat, that is to say in front of the at least one front air-guiding slat in the flow direction of the air. The front and rear air-guiding slats are thus arranged so as to be offset in the flow direction of the air through the air vent. Said front and rear air-guiding slats may in particular be arranged offset one behind the other such that they do not overlap in the flow direction. The front end of the at least one rear air-guiding slat may, as viewed in the flow direction, be arranged so as to directly adjoin the rear end of the at least one front air-guiding slat.

Although an arrangement of the at least one rear air-guiding slat upstream of the at least one front air-guiding slat is possible in accordance with this refinement, this is not imperative. Rather, it is also possible for the at least one rear air-guiding slat, in a manner dependent on its pivoting position, to be situated for example at the same level, in the flow direction, as the at least one front air-guiding slat. The terms "front" and "rear" air-guiding slat are thus not imperatively associated with a limitation with regard to the arrangement of the air-guiding slats in the flow portion. These terms rather relate to the interaction of the front end of the at least one rear air-guiding slat and of the rear end of the at least one front air-guiding slat to form the second flow cross section.

The at least one front air-guiding slat and the at least one rear air-guiding slat may in particular be coupled to each other in such a manner that they are pivotable in opposite directions between the two end positions.

In a further refinement, the first flow cross section may, in the end position(s), be smaller than the second flow cross section. As discussed, it is possible in particular for exactly one front air-guiding slat to be provided. By means of this refinement, an optimum and targeted air deflection in the desired direction is realized without turbulence or the like.

It is preferably possible for in each case at least one flow fin bounding the first flow cross section to be arranged on the housing wall. The flow fin(s) may for example be formed as a projection extending perpendicular to the housing wall. The first flow cross section is then thus formed between the at least one flow fin and the rear end of the at least one front air-guiding slat. A further optimization of the air guidance can be realized by means of such flow fins. The flow fins may be integrally connected to the housing wall, or may be mounted as a separate part on said housing wall. The at least one flow fin may, as viewed in the flow direction, be situated behind an imaginary plane lying perpendicular to the axis of symmetry of the at least one front air-guiding slat. The axis of symmetry of the at least one front air-guiding slat runs, in the rest position of the at least one front air-guiding slat, in the flow direction of the air.

The frame-shaped housing and the flow portion may have a rectangular cross section. The upper and lower housing walls are then thus arranged parallel to each other and of substantially planar form. The same applies to the lateral housing walls. The air outlet opening may also have a rectangular cross section. In some embodiments, no curved or angled sections of the housing walls are necessary for the flow guidance. It is thus furthermore possible for the cross section of the flow portion to have substantially the same size as the cross section of the air outlet opening. The housing may also, aside from the wall thicknesses of the housing walls, have the same cross section as the air outlet opening. Simple installation is achieved because the air vent can be inserted into an installation opening of the instrument panel from the front side facing towards the vehicle interior compartment. The installation opening may, aside from the wall thickness of the housing walls, correspond to the size of the air outlet opening, such that no undesired trim panel has to subsequently be used.

The at least one front air-guiding slat and the at least one rear air-guiding slat may be coupled to each other via coupling rods. The coupling rods may each be mounted with their first end pivotably on the rear end of the at least one front air-guiding slat and mounted with their second end pivotably on the front end of the at least one rear air-guiding slat. For example, the pivotal mounting may be realized by means of a latching mechanism. Coupling rods may be pivotably mounted in each case on both end faces of the at least one front air-guiding slat and of the at least one rear air-guiding slat.

It is alternatively also possible for the at least one front air-guiding slat and the at least one rear air-guiding slat to be coupled to each other via a slotted guide mechanism.

In a further refinement, it may be provided that at least one rear air-guiding slat is guided at its front end and at a rear end facing away from the at least one front air-guiding slat in a curved guide in such a manner that the at least one rear air-guiding slat executes a translational movement along the flow direction in addition to the pivoting movement between the end positions. For example, on the opposite end faces of the at least one rear air-guiding slat, in each case at the front end and at the rear end of the at least one rear air-guiding slat, there may be formed pins which are guided in corresponding guide grooves formed on the housing. The guide grooves may be formed in particular on opposite side walls of the housing. In the case of multiple rear air-guiding slats, it may be sufficient for only one of the rear air-guiding slats to be guided with its rear end in a curved guide of said type. The two rear air-guiding slats may be guided with their front ends in a curved guide. The guide grooves may self-eminently also be formed in each case on a separate component arranged on the side walls of the housing. By means of the curved guides, the at least one rear air-guiding slat is, in addition to its pivoting movement, also moved in translation in a defined manner, towards or away from the at least one front air-guiding slat depending on the pivoting direction. A reliably guided movement of the at least one rear air-guiding slat is thereby realized. Furthermore, the pivoting movement can be realized particularly easily in this way.

In a further refinement, the at least one front air-guiding slat may be mounted at its front end facing away from the at least one rear air-guiding slat so as to be pivotable centrally between an upper housing wall and a lower housing wall. In particular, the front end may, in the region of the air outlet opening, be mounted with the opposite end faces pivotably on a lateral housing wall.

The at least one rear air-guiding slat may be arranged at its rear end facing away from the at least one front air-guiding slat in the vicinity of a housing wall. The housing wall may be an upper or lower housing wall. In particular, the curved guides or guide grooves for the rear end of the at least one rear air-guiding slat may be formed in the vicinity of the upper or lower housing wall in opposite side walls of the housing. In the vicinity of the upper or lower housing wall means that the mounting of the rear end of the at least one rear air-guiding slat is realized at the upper or lower end respectively of the side walls of the housing. The proximity may be such that substantially no air flow is possible between the rear end of the rear air-guiding slat and the respective housing wall.

It is furthermore possible for at least two rear air-guiding slats to be provided which are coupled to the at least one front air-guiding slat in such a manner that the at least two rear air-guiding slats and the at least one front air-guiding slat are pivotable, preferably pivotable in opposite directions, between two end positions, wherein a first of the at least two rear air-guiding slats is arranged at its rear end facing away from the at least one front air-guiding slat in the vicinity of an upper housing wall, and wherein a second of the at least two rear air-guiding slats is arranged at its rear end facing away from the at least one front air-guiding slat in the vicinity of a lower housing wall. That which has been stated above then correspondingly applies to both rear air-guiding slats. In this refinement, it is in turn possible for exactly one front air-guiding slat to be provided.

In a further refinement in this regard, the at least two rear air-guiding slats in the end positions may be at different pivot angles with respect to the upper and lower housing wall. This relates in particular in each case to the pivot angle between the rear air-guiding slat and the housing wall in the vicinity of which the respective rear air-guiding slat is arranged. For example, the rear air-guiding slat in the direction of which the at least one front air-guiding slat is pivoted may, in the respective end position, have a zero or even negative pivot angle with respect to the housing wall assigned thereto, whereas the other rear air-guiding slat has a greater angle with respect to the housing wall assigned thereto. In this way, it can be achieved that, in the end positions, substantially always only one of the rear air-guiding slats participates in the flow deflection. The flow deflection can thus be set even more effectively.

The air-guiding elements may comprise further air-guiding slats which are mounted in the housing so as to be pivotable about a pivot axis perpendicular to the pivot axis of the at least one front air-guiding slat. Whereas the front and rear air-guiding slats discussed above form longitudinal slats which deflect the air stream for example upwards or downwards, these further air-guiding slats form transverse slats. By means of these transverse slats, an additional deflection of the air stream in a lateral direction is possible. All of the air-guiding slats can be easily actuated by means of the same actuating element. Separate actuating elements are however also conceivable.

The further air-guiding elements may be mounted pivotably on the housing or on the at least one rear air-guiding slat. The pivotable mounting on the at least one rear air-guiding slat may be realized for example by means of ball joints. In this way, the transverse slats can be positioned closer to the air outlet, and require less trimming in order to permit the movement of the rear longitudinal slats. Altogether, the result is an improved directing action of the air flow. Here, the transverse slats may be mounted rotatably on one or both of for example two rear longitudinal slats.

A closing flap for completely closing the air outlet opening may also be actuatable by means of the actuating element. For this purpose, the actuating element may for example additionally be rotatable.

The air vent shown in the figures has a rectangular housing 10 with an air inlet opening 12 and an air outlet opening 14. The air outlet opening 14 has a width several times greater than its height, as can be seen in particular in FIG. 1. As can also be seen in FIG. 1, the housing 10 has substantially the same cross-sectional size as the air outlet opening 14. Between the air inlet opening 12 and the air outlet opening 14, there is formed a flow portion for air, the cross section of which flow portion likewise has substantially the same size as the cross section of the air outlet opening 14. During operation, air flows from the air inlet opening 12 through the flow portion to the air outlet opening 14, and out of the latter into the interior compartment of a vehicle, such as a passenger motor vehicle or heavy goods vehicle.

The air vent shown in the figures has a front air-guiding slat 16 arranged in the region of the air outlet opening 14, on which front air-guiding slat there is arranged a manually actuatable actuating element 18. At the front end facing towards the air outlet opening 14, the front air-guiding slat 16 has, on its opposite end faces, in each case one pivot pin 20. The pivot pins 20 engage into associated pin receptacles on the opposite side walls of the housing 10, such that the front air-guiding slat 16 is mounted so as to be pivotable about a pivot axis running through the pivot pins 20. The pivot axis runs in the longitudinal direction of the air outlet opening 14. In the illustrated example, two rear air-guiding slats 22 are arranged upstream of the front air-guiding slat 16. At the rear end, facing away from the front air-guiding slat 16, of the rear air-guiding slats 22, a guide pin 24 is in turn formed on each of the face sides. The lower rear air-guiding slat 22 in the figures is guided with the guide pin 24 in each case in a guide groove 26 formed on opposite side walls of the housing 10. As can be seen in particular in FIGS. 2 to 5, the guide grooves 26 are formed in the vicinity of the lower housing wall of the housing 10. As can also be seen in the figures, the rear air-guiding slats 22 are arranged in front of the front air-guiding slat 16 in the flow direction of the air. The front air-guiding slat 16 and the rear air-guiding slats 22 are thus arranged offset with respect to each other in the flow direction. It can also be seen in the figures that one of the rear air-guiding slats 22 is arranged above the front air-guiding slat 16, and the other of the rear air-guiding slats 22 is arranged below the front air-guiding slat 16. In the rest position shown in FIG. 3, the rear air-guiding slats 22 are arranged symmetrically above and below the front air-guiding slat 16. In the example shown, the front air-guiding slat 16 and the rear air-guiding slats 22 are coupled to each other, so as to be pivotable relative to each other, by means of a total of four coupling rods 28. The coupling rods 28 are in each case pivotably mounted with one end thereof on the rear end of the front air-guiding slat 16, in each case in the region of the end faces of the front air-guiding slat 16. The coupling rods 28 are in each case pivotably mounted with the other end thereof on the front end of the rear air-guiding slats 22, in turn in each case in the region of the end faces of the rear air-guiding slats 22. Thus, in the example shown, a total of four coupling rods 28 are provided. For example, the coupling rods 28 may each engage around cylindrical bearing sections of the front air-guiding slat 16 and of the rear air-guiding slats 22. The rear air-guiding slats 22 furthermore have, on the end faces of their front end, guide pins 30 by means of which said rear air-guiding slats are in each case guided in further guide grooves 32 formed on opposite side walls of the housing 20.

Furthermore, a multiplicity of further air-guiding slats 34 is provided, which are pivotable about a pivot axis perpendicular to the pivot axis of the front air-guiding slat 16. In the example shown, the further air-guiding slats 34 may be mounted pivotably on the rear air-guiding slats 22 for example by means of ball joints. The actuating element 18 is also coupled to the further air-guiding slats 34, which may furthermore be coupled to each other in a manner known per se by means of one or more coupling rods.

Figure 3:
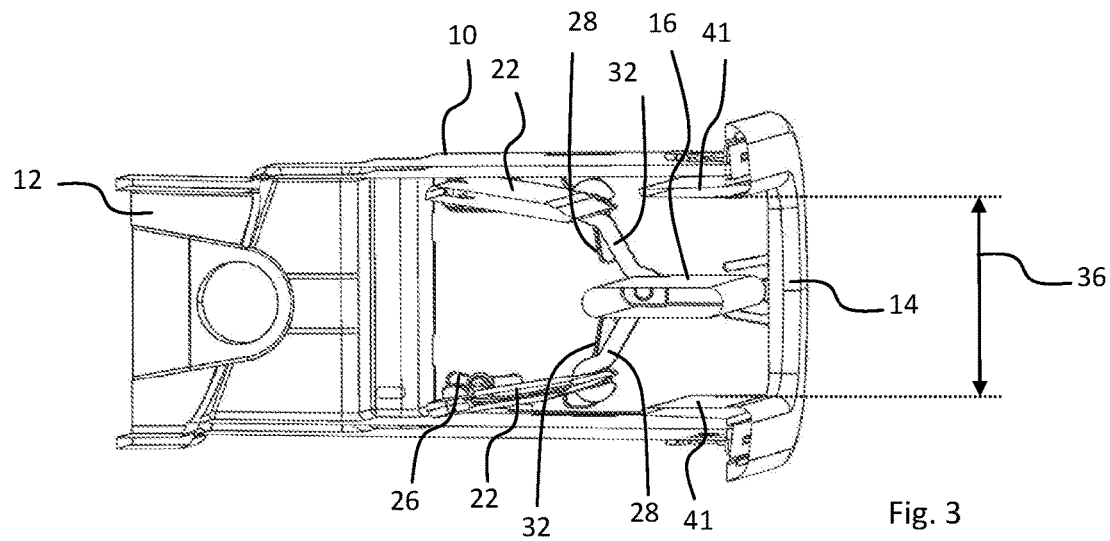
FIG. 3 shows a sectional view through the air vent shown in FIG. 1 in a first operating position.
Figure 4:
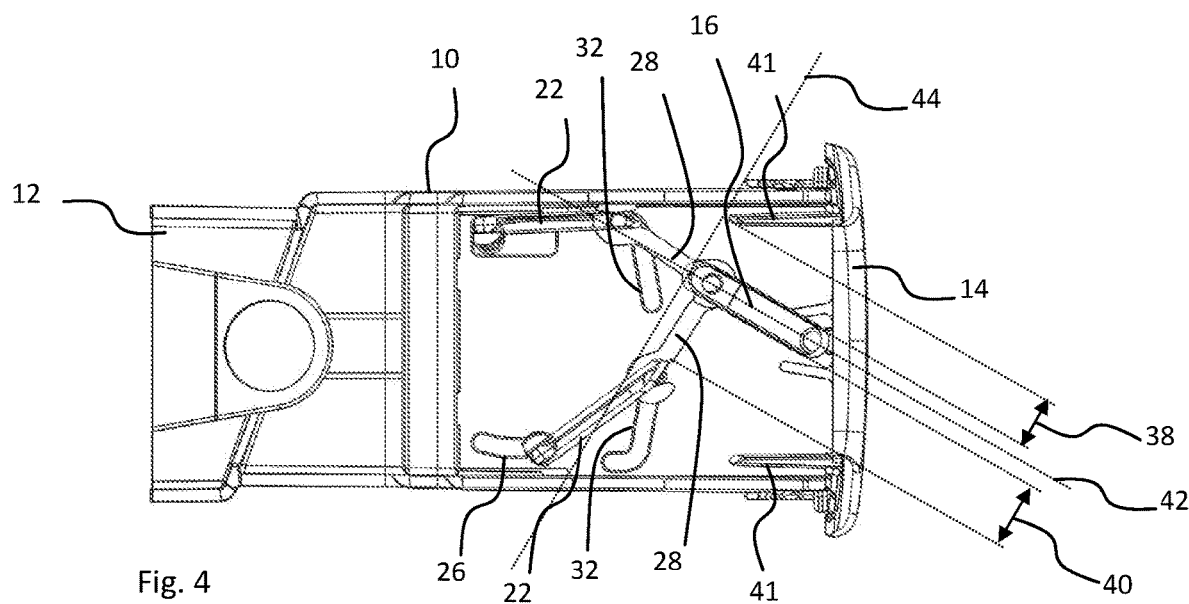
FIG. 4 shows the view from FIG. 3 in a second operating position.

By virtue of the actuating element 18 being displaced for example to the left or to the right in FIG. 1, the further air-guiding slats 34 are pivoted about their in this case vertical pivot axis. In this way, air flowing through the air vent can be deflected to the left or to the right. To deflect the air upwards or downwards, the actuating element 18 is pushed upwards or downwards proceeding from the operating position shown in FIG. 3. In FIG. 3, the air-guiding slats 16, 22 are situated in their rest position, in which they substantially do not deflect the air stream flowing through the air vent. Aside from the components situated in the flow path, in particular the front air-guiding slat 16, the maximum flow cross section 36 is available for the in this case horizontally emerging air flow. If, as a result of actuation of the actuating element 18, the front air-guiding slat 16 is pivoted into the first end position shown in FIG. 4, this pivoting movement is transmitted via the coupling rods 28 to the rear air-guiding slats 22, such that these assume the position shown in FIG. 4. It can be seen that the rear air-guiding slats 22 in this case perform not only a pivoting movement in the opposite direction to the front air-guiding slat 16 but also a translational movement, predefined by the guide grooves 26, 32. In this state, the rear air-guiding slats 22 are at different pivot angles with respect to the upper or lower housing wall respectively situated in the vicinity thereof. The upper rear air-guiding slat 22 in FIG. 4 has a negative pivot angle relative to the upper housing wall. The lower rear air-guiding slat 22 is at a larger positive pivot angle than the lower housing wall. In this state, the lower rear air-guiding slat 22 deflects the air flow in the direction of the front air-guiding slat 16, whereas the upper rear air-guiding slat 22 substantially does not participate in the air deflection. As can be clearly seen in FIG. 4, a flow cross section for throughflowing air is realized both above and below the front air-guiding slat 16. In particular, a first flow cross section 38 is formed between the rear end of the front air-guiding slat 16 and the upper housing wall, in the example shown a flow fin 41 arranged on the upper housing wall. The flow fin 41 is in this case situated, as viewed in the flow direction of the air, behind a plane 44 lying perpendicular to the axis of symmetry 42 of the front air-guiding slat 16, as shown by way of example in FIG. 4. A second flow cross section 40 is formed between the rear end of the front air-guiding slat 16 and the front end of the lower rear air-guiding slat 22. As can also be seen in the figure, the first flow cross section 38 is smaller than the second flow cross section 40. This arrangement has the effect that both the air flowing above the front air-guiding slat 16 and the air flowing below the front air-guiding slat 16 in each case attaches to the front air-guiding slat 16, specifically to the top side or the bottom side.

Figure 5:
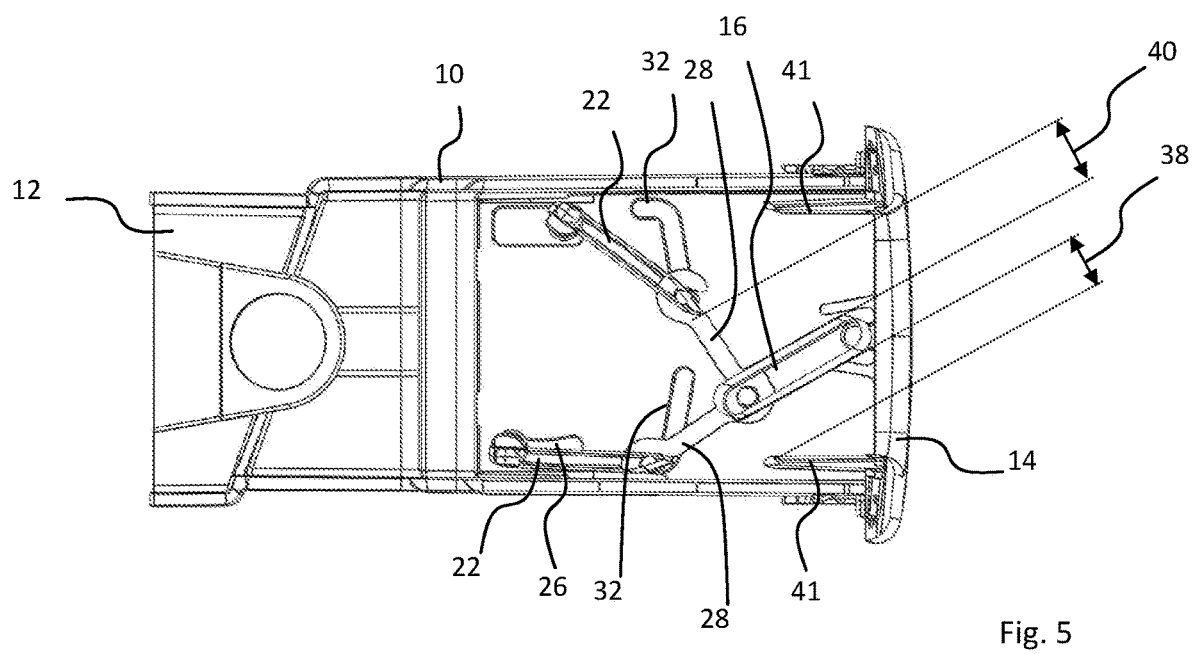
FIG. 5 shows the view from FIG. 3 in a third operating position.

FIG. 5 illustrates the other end position of the air-guiding slats. The arrangement and orientation of the front air-guiding slat 16 and of the rear air-guiding slats 22 is correspondingly mirror-inverted in relation to the arrangement shown in FIG. 4. The first flow cross section 38 is now formed for the air flowing below the front air-guiding slat 16, and the second flow cross section 40 is formed for the air flowing above the front air-guiding slat 16. Again, the air flow attaches to the bottom side and to the top side of the front air-guiding slat 16. The function corresponds here to the function discussed with regard to FIG. 4, such that, in this regard, repetitions will be omitted.

While various spatial and directional terms, such as upper, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the inventive subject matter. It is understood that the inventive subject matter disclosed and defined herein extends to all alternative combinations of two or more of the individual features mentioned or evident from the text and/or drawings. All of these different combinations constitute various alternative aspects of the inventive subject matter. The embodiments described herein explain the best modes known for practicing the inventive subject matter and will enable others skilled in the art to utilize the inventive subject matter. The claims are to be construed to include alternative embodiments to the extent permitted by the prior art.

What is claimed is:

1. An air vent for a vehicle, comprising:
    a housing with a rear-side air inlet opening and a front-side air outlet opening, between which a flow portion for air flowing along a flow direction from the air inlet opening to the air outlet opening is formed, wherein a plurality of air-guiding elements are arranged in the housing, and comprising an actuating element for actuating the air-guiding elements;
    wherein the air-guiding elements comprise at least one front air-guiding slat arranged in the region of the air outlet opening and at least one rear air-guiding slat, wherein the at least one rear air-guiding slat is offset in relation to the at least one front air-guiding slat in a direction perpendicular to the flow direction of the air, and wherein the at least one front air-guiding slat and the at least one rear air-guiding slat are pivotably coupled to each other and movable between two end positions;
    wherein the air can flow around the at least one front air-guiding slat on both sides in each of the end positions, wherein, in at least one end position, a first flow is defined by a rear end of the at least one front air-guiding slat and a fixed flow fin, said rear end facing the at least one rear air-guiding slat, and a second flow is defined by the rear end of the at least one front air-guiding slat and a front end of the at least one rear air-guiding slat, said front end facing the at least one front air-guiding slat.

2. The air vent according to claim 1, wherein the at least one rear air-guiding slat is arranged upstream of the front air-guiding slat.

3. The air vent according to claim 1, wherein the at least one front air-guiding slat and the at least one rear air-guiding slat are pivotable in opposite directions between the two end positions.

4. The air vent according to claim 1, wherein the first flow defines a first flow cross section that is smaller than a second flow cross section defined by the second flow.

5. The air vent according to claim 1, wherein the fixed flow fin is arranged on a housing wall and bounds the first flow.

6. The air vent according to claim 1, wherein the housing and the flow portion have a rectangular cross section.

7. The air vent according to claim 1, wherein the at least one front air-guiding slat and the at least one rear air-guiding slat are coupled to each other via coupling rods.

8. The air vent according to claim 1, wherein at least one rear air-guiding slat is guided by a groove such that the at least one rear air-guiding slat executes a translator movement along the flow direction in addition to pivoting between the end positions.

9. The air vent according to claim 1, wherein the at least one front air-guiding slat is mounted at the front end so as to be pivotable centrally between an upper housing wall and a lower housing wall.

10. The air vent according to claim 1, wherein the at least one rear air-guiding slat is arranged at the rear end near a housing wall.

11. The air vent according to claim 1, wherein the at least one rear air-guiding slat includes at least two rear air-guiding slats that are coupled to the at least one front air-guiding slat such that the at least two rear air-guiding slats and the at least one front air-guiding slat are pivotable between two end positions, wherein a first rear air-guiding slat of the at least two rear air-guiding slats is arranged at the rear end, and wherein a second rear air-guiding slat of the at least two rear air-guiding slats is arranged at the rear end, the first rear air-guiding slat being closer to an upper housing wall and the second rear air-guiding slat being closer to a lower housing wall.

12. The air vent according to claim 11, wherein, in the end positions, the first and second rear air-guiding slats are at different pivot angles with respect to the upper and lower housing walls.

13. The air vent according to claim 1, wherein the air-guiding elements also comprise additional air-guiding slats that are mounted in the housing so as to be pivotable about a pivot axis perpendicular to the pivot axis of the at least one front air-guiding slat.

14. The air vent according to claim 13, wherein the additional air-guiding slats are pivotably mounted to the housing or to the at least one rear air-guiding slat.

15. An air vent for a vehicle, comprising:
- a housing with a rear-side air inlet opening and a front-side air outlet opening, between which a flow portion for air flowing along a flow direction from the air inlet opening to the air outlet opening is formed;
- a plurality of air-guiding elements arranged in the housing;
- wherein the air-guiding elements include a front air-guiding slat, an upper rear air-guiding slat, and a lower rear air-guiding slat, wherein the upper and lower rear air-guiding slats are offset relative to the front air-guiding slat;
- wherein the front air-guiding slat is pivotably coupled to the upper rear air-guiding slat and to the lower rear air-guiding slat such that the front air-guiding slat and the upper and lower rear air-guiding slats are movable as a group between different end positions;
- wherein, in one of the end positions, a first flow is defined by a rear end of the front air-guiding slat and a fixed flow fin and a second flow is defined by the rear end of the front air-guiding slat and a front end of one of the upper or lower rear air-guiding slats.

16. The air vent according to claim 15, wherein at least one of the upper or the lower rear air-guiding slats is configured to move along the flow direction and to rotate as the group moves between the different end positions.

17. The air vent according to claim 15, wherein the first flow defines a first flow cross section and the second flow defines a second flow cross section, the first flow cross section and the second flow cross section having different sizes.

18. The air vent according to claim 15, wherein the front air-guiding slat has a height that is positioned between respective heights of the upper and lower rear air-guiding slats.

19. The air vent according to claim 15, wherein, for each of the different end positions, the upper and the lower rear air-guiding slats have different orientations with respect to the housing.

* * * * *